United States Patent

[11] 3,573,366

[72] Inventor Raymond S. Joseph
Chesapeake, Va.
[21] Appl. No. 672,343
[22] Filed Oct. 2, 1967
[45] Patented Apr. 6, 1971
[73] Assignee General Electric Company

[54] PLASTIC CHASSIS FOR A TELEVISION RECEIVER

2 Claims, 3 Drawing Figs.

[52] U.S. Cl. .......... 178/7.8, 178/7.9, 325/352
[51] Int. Cl. .......... H04n 5/645
[50] Field of Search .......... 178/7.8, 7.9; 317/99 (Cursory), 101 CP, 101 DH, 325/352, 119

[56] References Cited

UNITED STATES PATENTS

| | | | |
|---|---|---|---|
| 3,086,078 | 4/1963 | Sharma | 178/7.9 |
| 3,251,939 | 5/1966 | Pestka | 178/7.8 |
| 3,255,311 | 6/1966 | Hofmeister | 178/7.9 |
| 2,458,368 | 1/1949 | Kamin | 178/7.9 |
| 2,986,600 | 5/1961 | Pifer | 178/7.9 |
| 3,431,454 | 3/1969 | Sanders | 178/7.9 |

FOREIGN PATENTS

| | | | |
|---|---|---|---|
| 613,281 | 12/1960 | Italy | 178/7.9 |
| 1,196,930 | 11/1959 | France | 178/7.9 |

OTHER REFERENCES

Philco Television with exclusive Mark II Cool Chassis 178/7.9 - 2pp - Received scientific library Jan. 4, 1961

*Primary Examiner*—Richard Murray
*Assistant Examiner*—Joseph A. Orsino, Jr.
*Attorneys*—Francis H. Boos, Jr., Frank L. Neuhauser, Oscar B. Waddell, James E. Espe and Joseph B. Forman

ABSTRACT: In a television receiver, a plastic chassis comprises a substantially rigid base portion which serves as the sole means of support for a television receiver and includes a plurality of integrally molded mounting means for electronic components of the television receiver. The integrally molded mounting means include boss members, flexible pocket members, and flexible cup members. The cathode ray tube of the television receiver is also mounted on the plastic chassis on a front wall portion to provide an exposed though totally operative subassembly prior to the final steps in the assembly process. The plastic chassis is further adapted to receive closure panels of a rear closure member in integrally molded track members of the base portion to substantially complete the assembly.

INVENTOR:
RAYMOND S. JOSEPH,
BY Francis H. Boos, Jr.
HIS ATTORNEY.

PATENTED APR 6 1971

3,573,366

INVENTOR:
RAYMOND S. JOSEPH,
BY Francis H. Boos, Jr.
HIS ATTORNEY.

PLASTIC CHASSIS FOR A TELEVISION RECEIVER

BACKGROUND OF THE INVENTION

The invention relates to television receivers, and more specifically, it relates to television receiver chassis.

Because of the present day demand for low cost television receivers, it has become necessary to limit the cost of elements such as the chassis of the television receiver. Yet, it is extremely undesirable to sacrifice the aesthetics of the television receiver cabinet or the functional capabilities of the television receiver in order to achieve a cost saving. Since the chassis is neither of critical aesthetic value nor does it play an extremely delicate role in the functional capabilities of the television receiver, a cost advantage may be procured at this point without sacrifice.

There are several cost advantages which may be procured in the chassis of the television receiver. A first cost advantage is achieved by requiring the chassis to double as a supporting base. A second is the use of integrally molded, flexible electronic component mounting means in combination with the chassis, which mounting means presently exist in the art and generally may be characterized as comprising molded plastic. A third is the use of the chassis as a pallet on an assembly line thereby eliminating the need for plywood pallets or equivalents.

Although integrally molded mounting means have been available for some time, they have never been combined with a chassis which may serve as a pallet on an assembly line as well as the supporting base of the television receiver. In fact, snap-in mounting means have generally been associated with the walls of a television receiver cabinet rather than the chassis and were therefore assembled separately from other circuit elements which were secured to the chassis as it rode a pallet down the assembly line. By this use of flexible mounting means, it was necessary to combine the chassis of the television receiver as well as that portion of the cabinet carrying the flexible mounting means in order to effect final wiring of the receiver. In effect then, the prior art method necessitates the final assembly of separate distinct subassemblies produced at different points on an assembly line and the combining of these subassemblies into a completed receiver prior to testing. If the receiver should then test below the standards of quality control, it would then be necessary to disassemble the cabinet to obtain access to the circuitry.

As must be appreciated, the assembly of a television receiver comprising distinct and separately assembled subassemblies does of necessity add expense and difficulties to the manufacture of a television receiver. Furthermore, the required disassembly of a completed receiver failing to meet quality control standards is far more expensive than if corrections to meet these standards are made before the cabinet of the receiver is in place. Finally, separate subassemblies add undesirable weight to a television receiver which is inconsistent with today's trends in portability.

SUMMARY OF THE INVENTION

It is therefore an object of this invention to produce a television receiver at a reduced cost through a simplified assembly process.

It is a further object of this invention to produce a television receiver capable of final testing prior to final assembly and which can be easily serviced during the life of the set.

It is an additional object of this to reduce the overall weight of a television receiver.

In accordance with certain aspects of this invention, there is provided a television receiver cabinet for housing electronic components comprising an integrally molded plastic chassis including a base portion for mounting substantially all of the electronic components directly or indirectly thereon. The base portion includes a plurality of integrally molded mounting means in and on which the electronic components may be mounted including a cathode ray tube. The base portion further includes openings with parallel track members mounted adjacent thereto for receiving closure panels of a cabinet closure member. The chassis also includes a front wall portion with additional molded mounting means thereon.

In certain embodiments of the invention, the base portion may comprise integrally molded and normally extending boss members adjacent service openings in the base portion and on which circuit boards may be mounted. Various electronic components may be mounted on additional mounting means comprising molded bosses, molded ribs with snap-in clips, molded springs, or a combination thereof. The front wall portion of the chassis includes specific mounting means in the form of track means for mounting a tuner adjacent flanges for mounting a cathode ray tube.

BRIEF DESCRIPTION OF THE DRAWINGS

The specification concludes with claims particularly pointing out and distinctly claiming the subject matter which is regarded as the invention The invention may also be understood from the following description taken in connection with the accompanying drawings in which:

DESCRIPTION OF THE PREFERRED EMBODIMENT

Figure 1:
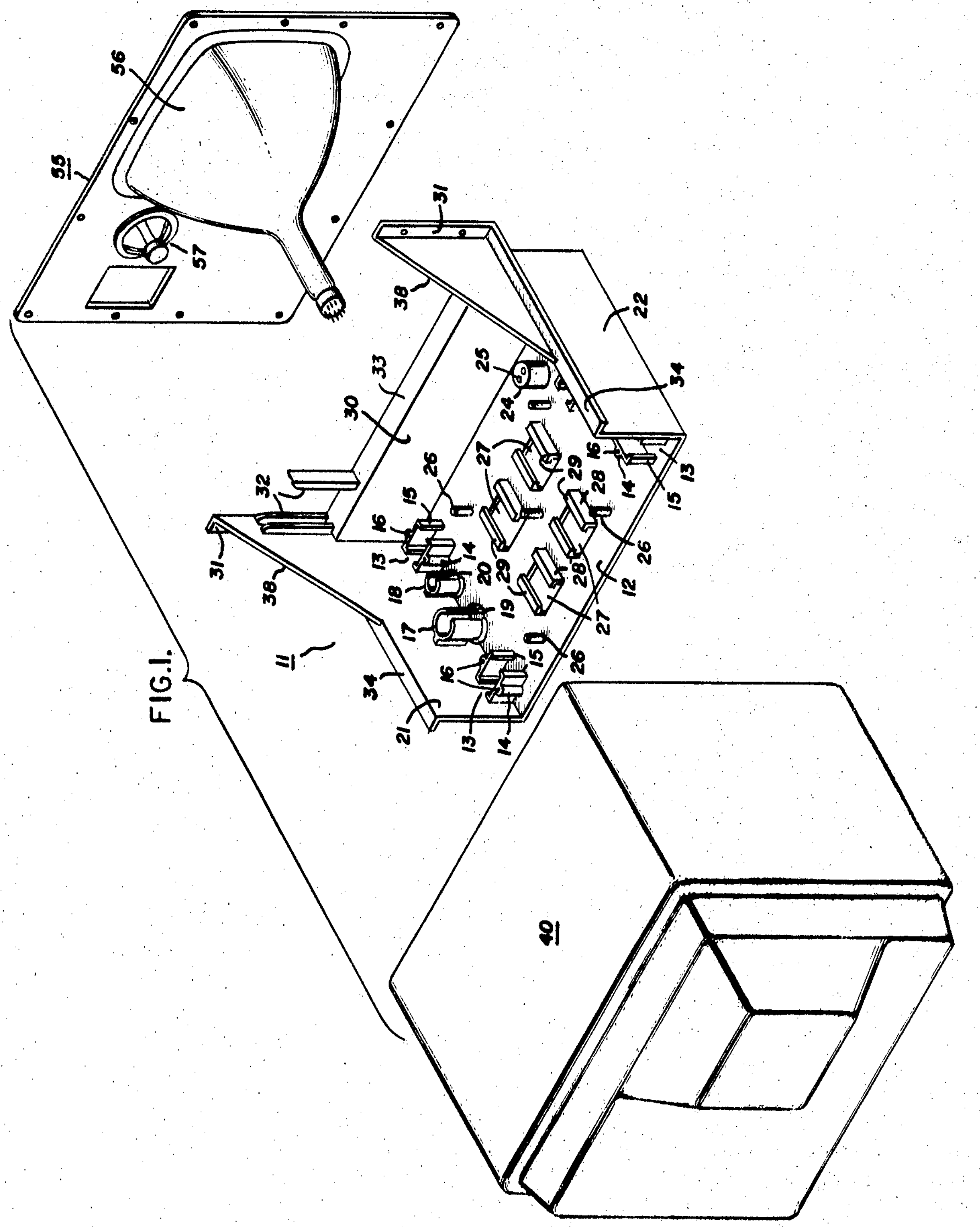
FIG. 1 is an exploded view of the integrally molded chassis of a television receiver in combination with a disassembled frontal member carrying a cathode ray tube and a rear closure member.

As disclosed in FIG. 1, a molded plastic chassis 11 comprises a substantially rigid base portion 12 which doubles as a supporting surface of mounting means for electronic components of a television receiver and also as the sole supporting means for the receiver. In order to provide means for mounting substantially all of the electronic components directly or indirectly upon the chassis 11, the base portion 12 includes a plurality of integrally molded mounting means extending normally therefrom and providing integrally molded fixtures as required by the shapes, sizes, and numbers of the particular electronic components of the television receiver.

Although the exact nature of the fixtures may vary considerably, the chassis as shown includes component mounting pockets 13 which comprise apertured boss members 14 mounted parallel and in integral relationship with flexible wall members 15. In order to secure the components; i.e., transformers, in place, screw members may be inserted into apertures 16 of the boss members 14.

In order to provide mounting means for electrolytic capacitors, a large flexible cup 17 and a small flexible cup 18 are provided which are integrally molded with the base portion along an edge thereof. Both the large cup 17 and the small cup 18 are disconnected from the base portion 12 on the segment of the circumferences adjacent slots 19 and 20 to allow considerable flexibility when inserting electrolytic capacitors in place. Both the spring cups 17 and 18 are also integrally molded with a sidewall portion 21 which provides support for a front wall portion 30 as well as certain of the integrally molded pocket wall members 15. Similarly, an opposing sidewall portion 22 may provide integral support for other, partially shown, pocket wall members 15. Adjacent the partially shown pocket wall members 15, along the sidewall portion 22, a circular cup 24 which is suitably adapted for a high voltage rectifier may be integrally molded with the base portion 12. Apertured boss members 25 are enclosed within the cup 24 to provide socket mounting means for a high voltage rectifier.

In the center of the base portion 12, there is provided a plurality of apertured boss members 26 which serve as mounting and elevating means for a circuit board (not shown) to be positioned over a plurality of service openings 27. Each of the service openings 27 is bordered along two edges thereof by parallel track means including vertically extending flanges 28 and horizontally extending flanges 29. These flanges serve to guide closure panels 42 located on a rear closure member 40 (see FIG. 2) under the circuit board which is mounted on the boss members 26. The panels 42 are easily removed to provide ease of access through the openings 27 for later servicing of the circuit board.

Further mounting means for the electronic components are integrally formed with a front wall portion 30 which extends generally vertically from the base portion 12 of the plastic chassis 11. Although a plurality and variety of electronic components may be mounted thereon, apertured mounting flanges 31 are specifically provided in this embodiment to aid in mounting a cathode ray tube 56 and a speaker 57 which are secured to a frontal member 55. As illustrated in FIG. 1, these apertured flanges 31 extend generally vertically from the base portion 12. In addition, vertically extending opposing tuner mounting tracks 32 are provided which are integrally molded with the front wall portion 30. A horizontally extending flange 33 is provided on the front wall portion 30 to effect closure with the frontal member 55, while similar flanges 34 are integrally molded with the sidewall portions 21 and 22 to effect a closure with the sides of the rear closure member 40. In order to provide reinforcement for the flanges 31, support members 38 are integrally molded therewith and with the sidewall portions 21 and the flanges 34.

Although specific integrally molded mounting means have been disclosed which are specifically adapted to particular electronic components, a variety of molded fixtures might be provided and fall within the scope of the invention. As an example, the boss members 14, 25 and 26 may include detents for cold staking the components and circuit board in place rather than the apertures provided for receiving screw fastening means. Furthermore, the precise shapes of the fixtures may change considerably by appropriate substitution of spring clips in combination with molded ribs or molded springs. Furthermore, the tuner mounting means may be moved to the sidewall portions 21 and 22.

Figure 2:
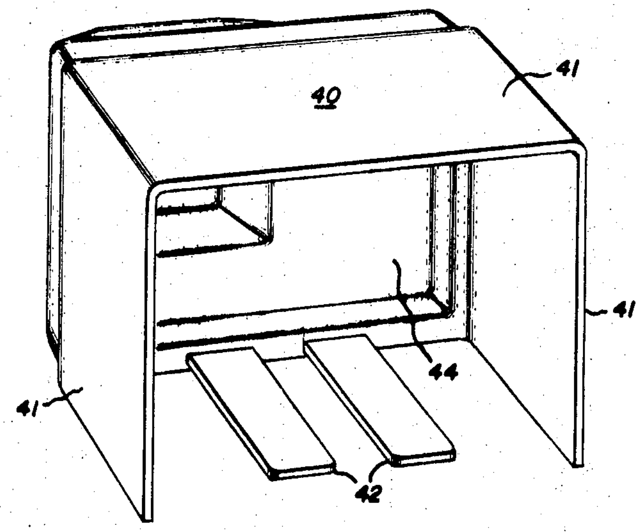
FIG. 2 is an internal view of the rear closure member of the receiver which overlies the chassis of FIG. 1.

The chassis as disclosed in FIGURE 1 is complemented by a closure member 40 of FIG. 2 including outer closure surfaces 41 and horizontally extending closure panels 42. These closure panels 42, referred to previously, are adapted to mate with the track means comprising the vertical flanges 28 and the horizontal flanges 29 adjacent the service openings 27. As may be seen, the rear closure member 40 does not carry electronic circuitry. As a result, the receiver may be tested on the line prior to complete assembly. This, of course, achieves a further cost saving consistent with the objective set forth previously in the specification. Note that the lower region of the rear closure member 40 is completely open with the exception of the closure panels 42 thereby allowing the chassis 11 to serve as the supporting base for the television receiver.

Figure 3:
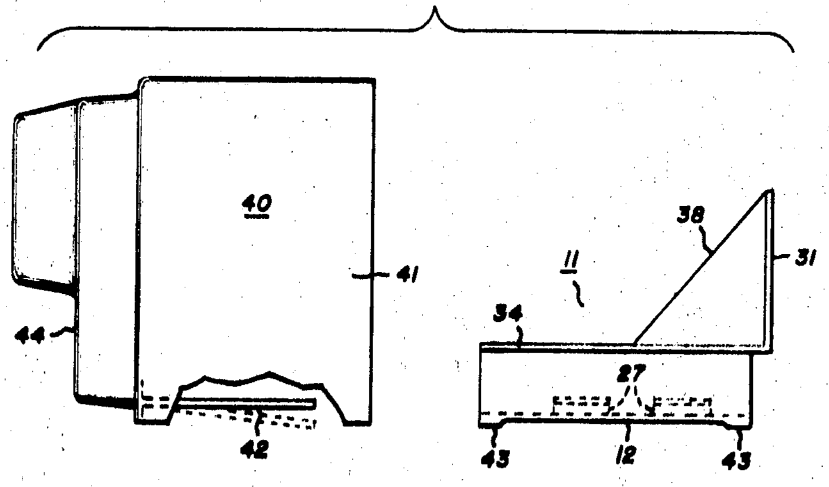
FIG. 3 is a disassembled side view of the chassis and the rear closure member absent the cathode ray tube of the frontal member.

The nature of the interrelationship between the rear closure member 40 and the plastic chassis 11 may be viewed in FIG. 3. As shown, the bottom of the base portion 12 of the plastic chassis 11 includes legs 43 which serve to support the entire receiver after the manufacturing process as well as the exposed but assembled electronic components prior to completion of the receiver. Although the cathode ray tube 56 is not shown in FIG. 3, it too would be mounted on the chassis 11 in the frontal member 55 prior to positioning the rear closure member 40.

As mentioned previously, it is not intended to limit the invention disclosed herein to a particular shape of chassis or particular mounting fixtures within that chassis but only to provide an integrally molded chassis which is capable of doubling as the base portion of a television receiver independently of a shell-like closure member. Although the closure member 40 has been disclosed as including a back portion 44, it is well within the scope of the invention to include an equivalent of that back portion on the plastic chassis 11. This, of course, is possible and aesthetically sound since the rear of a television receiver cabinet is less closely scrutinized than the side, upper or front portions.

Although additional specific embodiments have been shown and described, and it is not desired that the invention be limited to the particular features of the embodiment but it is intended by the appended claims to include all modifications within the spirit and scope of the invention.

I claim:

1. An integrally molded chassis for a television receiver comprising:
- a substantially rigid base portion adapted to serve as the sole means of support for the television receiver;
- said base portion having service access openings therein;
- a front wall portion extending generally vertically from said base portion;
- electronic component mounting means integrally molded with and extending generally vertically from said base portion;
- said electronic component mounting means including boss members extending generally vertically from said base portion adjacent said openings and adapted to support circuit boards of the television receiver; and
- parallel track members integrally molded with said base portion and adjacent said openings, said track members being adapted to receive a closure member.

2. An integrally molded chassis for a television receiver comprising:
- a substantially rigid base portion adapted to serve as the sole means of support for the television receiver, said base portion including parallel track members adapted to receive a closure member of the television receiver and said track members being located adjacent service access openings provided in said base portion;
- a front wall portion extending generally vertically from said base portion;
- at least one sidewall portion extending generally vertically to said base portion; and
- first, second, and third electronic component mounting means, said first electronic component mounting means being integrally molded with said front wall portion and including cathode ray tube mounting means comprising flanges extending generally vertically from said base portion and further including parallel track members adapted to support the television receiver tuning means, said second electronic component mounting means being integrally molded with said sidewall portion, said third electronic component mounting means including boss members extending generally vertically from said base portion and being adapted to support circuit boards of the television receiver, and said second electronic component mounting means including pocket and cup members extending generally vertically from said base portion.